(12) United States Patent
Marggraff (10) Patent No.: US 8,944,824 B2
(45) Date of Patent: Feb. 3, 2015

(54) MULTI-MODAL LEARNING SYSTEM

(75) Inventor: Jim Marggraff, Lafayette, CA (US)

(73) Assignee: Livescribe, Inc., Oakland, CA (US)

( * ) Notice: Subject to any disclaimer, the term of this patent is extended or adjusted under 35 U.S.C. 154(b) by 996 days.

(21) Appl. No.: 12/415,789

(22) Filed: Mar. 31, 2009

(65) Prior Publication Data

US 2009/0253107 A1    Oct. 8, 2009

Related U.S. Application Data

(60) Provisional application No. 61/042,236, filed on Apr. 3, 2008.

(51) Int. Cl.
*G09B 11/00* (2006.01)
*G06F 3/0354* (2013.01)
*G06F 3/03* (2006.01)
(Continued)

(52) U.S. Cl.
CPC ............ *G09B 11/00* (2013.01); *G06F 3/03545* (2013.01); *G06F 3/0317* (2013.01); *G06K 9/00436* (2013.01); *G06F 3/04883* (2013.01); *G06K 9/222* (2013.01); *G06F 3/0488* (2013.01); *G09B 19/06* (2013.01)
USPC ........... 434/162; 434/163; 434/165; 434/391; 382/187; 382/188; 382/189; 708/107

(58) Field of Classification Search
CPC .............. G06F 3/03545; G06F 3/0317; G06F 3/04883; G06F 3/0488; G06K 9/222; G06K 9/00436; G09B 19/06; G09B 11/00
USPC .......... 345/169, 180, 181, 182, 183; 434/162, 434/163, 165, 391; 382/188, 187, 189; 708/107
See application file for complete search history.

(56) References Cited

U.S. PATENT DOCUMENTS 4,141,073 A * 2/1979 Tan ............................... 708/107
5,174,759 A * 12/1992 Preston et al. ................. 434/317
(Continued)

FOREIGN PATENT DOCUMENTS

JP    H08-101633 A    4/1996
JP    08-314609       11/1996
(Continued)

OTHER PUBLICATIONS

Yoko et al, Machine Translation of Japanese Patent Publication No. JP 2004-205962, pp. 1-32.*
(Continued)

*Primary Examiner* — Jack Yip
(74) *Attorney, Agent, or Firm* — Fenwick & West LLP (57) ABSTRACT

An instruction is presented to a user for making a target gesture. The target gesture may be a portion of an exemplary or model symbol. The instruction may be presented in various ways, such as being printed on a writing surface or being played in audio format through a speaker of a smart pen device. A writing gesture made on a writing surface by the user is digitally captured using a smart pen device. The captured writing gesture is compared to the target gesture and feedback is determined based on this comparison. This feedback may indicate the correctness of the user's writing gesture. The feedback may be presented to the user through various means, including through the smart pen device. The comparison may also be used to determine a next instruction for the user to follow.

20 Claims, 4 Drawing Sheets

(51) Int. Cl.
  *G06K 9/00* (2006.01)
  *G06F 3/0488* (2013.01)
  *G06K 9/22* (2006.01)
  *G09B 19/06* (2006.01)

(56) References Cited

U.S. PATENT DOCUMENTS

| | | | |
|---|---|---|---|
| 5,484,288 A * | 1/1996 | DelGigante | 434/163 |
| 5,852,434 A | 12/1998 | Sekendur | |
| 6,081,261 A * | 6/2000 | Wolff et al. | 345/179 |
| 6,130,666 A * | 10/2000 | Persidsky | 345/179 |
| 6,181,329 B1 * | 1/2001 | Stork et al. | 345/179 |
| 6,201,903 B1 * | 3/2001 | Wolff et al. | 382/317 |
| 6,212,296 B1 * | 4/2001 | Stork et al. | 382/188 |
| 6,215,901 B1 * | 4/2001 | Schwartz | 382/186 |
| 6,218,964 B1 | 4/2001 | Ellis | |
| 6,535,204 B2 * | 3/2003 | Sun | 345/173 |
| 6,831,632 B2 * | 12/2004 | Vardi | 345/179 |
| 7,082,444 B2 * | 7/2006 | Braun et al. | 1/1 |
| 7,167,586 B2 * | 1/2007 | Braun et al. | 382/203 |
| 7,175,095 B2 | 2/2007 | Pettersson et al. | |
| 7,249,950 B2 * | 7/2007 | Freeman et al. | 434/155 |
| 7,281,664 B1 | 10/2007 | Thaeler et al. | |
| 7,343,042 B2 * | 3/2008 | Braun et al. | 382/203 |
| 7,417,773 B2 * | 8/2008 | Braun et al. | 358/403 |
| 7,659,891 B2 * | 2/2010 | Mackenzie | 345/179 |
| 7,819,433 B2 * | 10/2010 | Schulken | 283/45 |
| 7,831,933 B2 * | 11/2010 | Marggraff et al. | 715/863 |
| 7,853,193 B2 * | 12/2010 | Marggraff | 434/317 |
| 7,865,018 B2 * | 1/2011 | Abdulkader et al. | 382/186 |
| 7,911,457 B2 * | 3/2011 | Vardi | 345/179 |
| 8,025,504 B2 * | 9/2011 | Freeman et al. | 434/155 |
| 8,081,171 B2 * | 12/2011 | Adams et al. | 345/179 |
| 8,094,139 B2 * | 1/2012 | Bergstrom et al. | 345/179 |
| 2001/0035976 A1 * | 11/2001 | Poon | 358/1.15 |
| 2002/0107885 A1 * | 8/2002 | Brooks et al. | 707/505 |
| 2004/0061888 A1 * | 4/2004 | Braun et al. | 358/1.15 |
| 2004/0064486 A1 * | 4/2004 | Braun et al. | 707/203 |
| 2004/0064783 A1 * | 4/2004 | Braun et al. | 715/500 |
| 2004/0064787 A1 * | 4/2004 | Braun et al. | 715/505 |
| 2004/0085301 A1 * | 5/2004 | Furukawa et al. | 345/179 |
| 2004/0229195 A1 | 11/2004 | Marggraff et al. | |
| 2005/0024346 A1 * | 2/2005 | Dupraz et al. | 345/179 |
| 2005/0093845 A1 * | 5/2005 | Brooks et al. | 345/179 |
| 2005/0106538 A1 * | 5/2005 | Freeman et al. | 434/167 |
| 2005/0125228 A1 * | 6/2005 | Samuels | 704/260 |
| 2005/0188306 A1 * | 8/2005 | Mackenzie | 715/530 |
| 2006/0033725 A1 | 2/2006 | Marggraff et al. | |
| 2006/0066591 A1 | 3/2006 | Marggraff et al. | |
| 2006/0067576 A1 | 3/2006 | Marggraff et al. | |
| 2006/0067577 A1 | 3/2006 | Marggraff et al. | |
| 2006/0077184 A1 | 4/2006 | Marggraff et al. | |
| 2006/0078866 A1 | 4/2006 | Marggraff et al. | |
| 2006/0080608 A1 | 4/2006 | Marggraff et al. | |
| 2006/0080609 A1 | 4/2006 | Marggraff et al. | |
| 2006/0125805 A1 | 6/2006 | Marggraff et al. | |
| 2006/0127872 A1 | 6/2006 | Marggraff et al. | |
| 2006/0158440 A1 | 7/2006 | Ashenbrenner | |
| 2006/0267965 A1 * | 11/2006 | Clary | 345/179 |
| 2006/0269168 A1 * | 11/2006 | Kasabach et al. | 382/314 |
| 2006/0292543 A1 | 12/2006 | Marggraff et al. | |
| 2007/0025645 A1 * | 2/2007 | Slatter | 382/313 |
| 2007/0097100 A1 | 5/2007 | Marggraff et al. | |
| 2007/0114367 A1 * | 5/2007 | Craven-Bartle et al. | 250/227.13 |
| 2007/0263019 A1 * | 11/2007 | Furukawa et al. | 347/5 |
| 2007/0280627 A1 | 12/2007 | Marggraff et al. | |
| 2008/0048991 A1 * | 2/2008 | Freeman et al. | 345/173 |
| 2008/0097828 A1 * | 4/2008 | Silverbrook et al. | 705/10 |
| 2008/0181501 A1 * | 7/2008 | Faraboschi et al. | 382/179 |
| 2008/0296074 A1 * | 12/2008 | Hollstron et al. | 178/19.01 |
| 2009/0182527 A1 * | 7/2009 | Wiebe et al. | 702/150 |

FOREIGN PATENT DOCUMENTS

| | | |
|---|---|---|
| JP | 2001-272908 A | 10/2001 |
| JP | 2002-229435 A | 8/2002 |
| JP | 2003-084656 | 3/2003 |
| JP | 2004-045844 | 2/2004 |
| JP | 2004-205962 | 7/2004 |
| JP | 2004-362483 | 12/2004 |
| JP | 2005-221576 | 8/2005 |
| JP | 2006-171249 | 6/2006 |
| WO | WO 02/19295 A1 | 3/2002 |
| WO | WO 2006010737 A2 * | 2/2006 |
| WO | WO 2007/141204 A1 | 12/2007 |

OTHER PUBLICATIONS

PCT International Search Report and Written Opinion, PCT Application No. PCT/US2009/039366, May 20, 2009, 6 pages.
State Intellectual Property Office of the People's Republic of China, Notification of the First Office Action, Chinese Patent Application No. 200980117877.6, Jul. 16, 2012, 8 pages (with English translation).
Japanese Patent Office, Official Notice of Rejection, Japanese Patent Application No. 2011-503187, Dec. 25, 2012, eight pages.
State Intellectual Property Office of the People's Republic of China, Notification of Second Office Action, Chinese Patent Application No. 200980117877.6, May 15, 2013.
Japanese Patent Office, Official Notice of Rejection, Japanese Patent Application No. 2011-503187, Jul. 2, 2013, eight pages.
Japanese Patent Office, Decision to Decline the Amendment and Final Decision of Rejection, Japanese Patent Application No. 2011-503187, Dec. 24, 2013, nine pages.
State Intellectual Property Office of the People's Republic of China, Third Office Action, Chinese Patent Application No. 200980117877.6, Sep. 6, 2013, ten pages.

* cited by examiner

MULTI-MODAL LEARNING SYSTEM

CROSS REFERENCE TO RELATED APPLICATIONS

This application claims the benefit of U.S. Provisional Application No. 61/042,236, filed Apr. 3, 2008, which is incorporated by reference in its entirety.

BACKGROUND

This invention relates generally to pen-based computing systems, and more particularly to instructional or educational uses of pen-based computing systems. It is desirable to teach the writing and recognition of symbols for use in reading and writing language, mathematics, science, music, art, and other subjects. Symbols may include characters, diagrams, shapes, and other glyphs. Examples are Mandarin Chinese characters, shapes of states, molecular structures, and mathematical formulas. Teaching that is focused on learning to write and recognize symbols often requires rote practice of writing by observing and copying an exemplar (e.g., from a textbook). There is little direct feedback or encouragement to the student regarding his or her success in accurately re-creating the symbol. Teaching the student acceptable variances of a symbol is difficult and is typically achieved by providing the student with a set of acceptable alternate instances of the symbol.

In some instances, the proper sequencing of writing strokes for a symbol must also be learned. In these instances, communicating the stroke order via a printed diagram is clumsy and confusing. Again, the lack of feedback as the student practices writing the symbol with properly ordered strokes is inefficient and does not help motivate the student.

Typically, learning to write a symbol is decoupled in time or space from the context of learning the meaning or application of the symbol. For example, writing symbols in mathematical expressions involves Greek letters and many symbols unique to the field. The lack of immediate or meaningful feedback regarding symbol formation and syntax of expressions slows learning and requires more practice.

The locus of user visual focus is often quite large in typical learning systems. For instance, if a user is studying from a textbook or other printed material to learn to draw a symbol, the user must look at examples in the text, then shift visual focus to the piece of paper on which the user is writing. To check the correctness of the user's partially drawn symbol, the user must look back and forth between the paper and the text. This is inefficient and not optimal.

If the user is able to look very near the writing area to see the exemplar while drawing the symbol, the user can better retain the context of the exemplar. Consider the challenge in drawing a twenty stroke complex Mandarin character, looking back and forth between the character in a text book and the partially drawn character on the paper. In such a situation, many students will try to pull the text book as near as possible to the location where they are drawing the character. Further, once the character is fully drawn, it is still valuable to have the exemplar near the drawing to verify its correctness.

Consumable paper workbooks allow a user to write directly near an exemplar, narrowing the user's locus of focus, but a workbook is consumable and often expensive. A workbook also offers no dynamic or contextual feedback.

Tablet personal computers (tablet PCs) or similar systems are capable of presenting a user with an ongoing stream of information with changing, even dynamic, visuals. The system can provide contextual interpretation and immediate feedback in multiple modalities—aural or visual, and can provide a limited locus of visual focus. However, tablet PCs are expensive, bulky, consume substantial power, and may require frequent charging. Tablet PCs also offer unfamiliar and possibly undesirable tactile feedback to a user when writing on a glass screen. Further, for a tablet PC or any display device with protective transparent material, the issue of parallax exists when writing on a screen surface separated by a distance from the display, coupled with limited absolute resolution of many pen-tracking technologies for tablet PCs.

Accordingly, there is a need for techniques to more effectively teach the writing and recognition of symbols within the associated context of the symbols.

SUMMARY

Embodiments of the invention present a new way to instruct a user, through the use of a pen-based computing system, in writing symbols. An instruction is presented to a user for making a target gesture. The target gesture may be a portion of an exemplary or model symbol that is being taught to the user. The instruction may be presented in various ways, such as being printed on a writing surface or being played in audio format through a speaker of a digital pen device. A writing gesture made on a writing surface by the user is digitally captured using a digital pen device. The captured writing gesture is compared to the target gesture and feedback is determined based on this comparison. This feedback may indicate that the correctness of the user's writing gesture. The feedback may be presented to the user through various means, including through the digital pen device. The comparison may also be used to determine a next instruction for the user to follow (e.g., if the target gesture and the captured writing gesture are similar enough, the user can be presented with instructions for drawing more advanced symbols). Instructional modules may be created that include a plurality of instructions and target gestures, where each instruction corresponds to a target gesture and where the instructions have a defined sequence. These instructional modules may be created by capturing target gestures from an instructor using a digital pen device and by capturing instructions corresponding to the target gestures.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
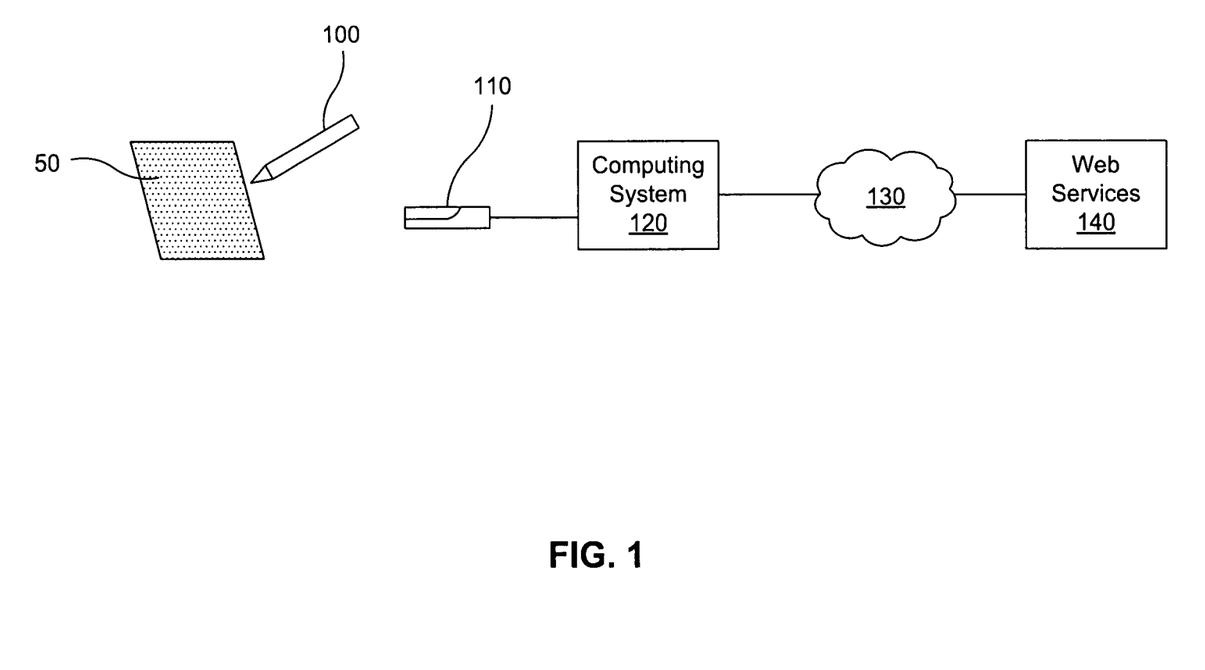
FIG. 1 is a schematic diagram of a pen-based computing system, in accordance with an embodiment of the invention.

Embodiments of the invention may be implemented on various embodiments of a pen-based computing system, and other computing and/or recording systems. An embodiment of a pen-based computing system is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
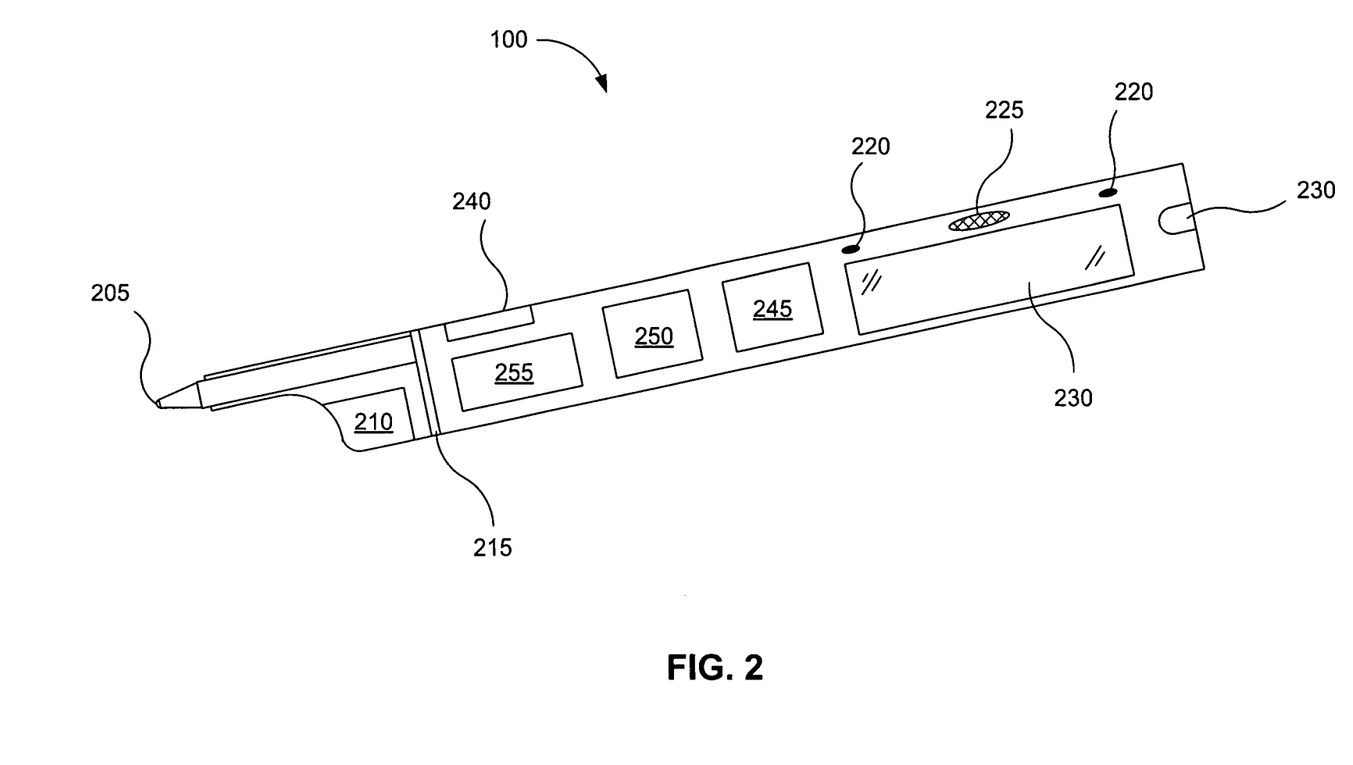
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Overview of Learning System

Embodiments of the invention present a new way to instruct a user, through the use of a pen-based computing system, in writing symbols that includes various types of feedback to the user. Instructions are presented to a user explaining how to draw a symbol. An initial instruction may include instructions for drawing an initial portion of the symbol. The user attempts to follow the instructions by making writing gestures with a smart pen 100 on dot-enabled paper 50. The gestures are received by the smart pen 100, and feedback is provided to the user based on how well the gestures matched the desired symbol according to the instructions. Instructions and feedback can be provided through various means, such as through display on the smart pen 100 or attached computing system 120, or through a speaker 225 on the smart pen or attached computing system (e.g., for audio instructions). Instructions may also be provided in written form, such as being pre-printed on the dot-enabled paper 50. The instructions may include a visual representation of the desired symbol.

A sequence of instructions and user feedback can be bundled together in an instructional module for instructing the user in writing symbols. This instructional module can be created by an application that records instructions and exemplary symbols (or gestures comprising a symbol) and stores these instructions and symbols.

The following discussion of various embodiments of the invention is presented with reference to the figures. FIG. 1 is a block diagram of an example architecture for providing instruction using a pen-based computing system. FIG. 1 illustrates a piece of dot-enabled paper 50 and a smart pen 100 that can be used in conjunction with the paper 50. The operations described below may be performed by an application running on the processor of the pen 100, by an application running on an attached computing system 120, or a combination of the two.

Figure 3:
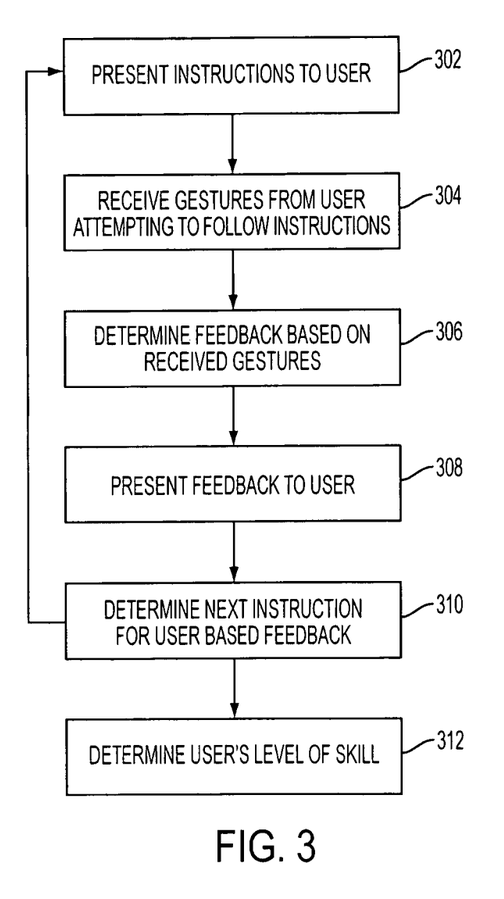
FIG. 3 illustrates an embodiment of a process for providing instruction using a pen-based computing system.

FIG. 3 illustrates an embodiment of a process for providing instruction using a pen-based computing system. In this process, instructions are presented 302 to a user of a smart pen 100. These instructions may specify how to draw a symbol or a portion of a symbol. As further described below, the instructions can contain graphical or animated content and can be provided through a variety of interfaces (e.g., the smart pen display 235 or speaker 225, or pre-printed on a portion of the paper 50).

The smart pen 100 receives 304 gestures from the user as the user attempts to follow the instructions. The gestures may comprise the strokes made by the user with the smart pen 100 on the dot-enabled paper 50, the speed of the strokes, the order of the strokes, the pressure of the pen on the paper (from a pressure sensor on the smart pen) or other types of information. The gestures made by the user may or may not result in actual writing to the paper with the marker 205. In either case, the imaging system 210 of the smart pen 100 is able to capture the gestures. In one embodiment, the gestures are received from a user attempting to trace over a pre-printed symbol.

The smart pen 100 determines 306 feedback based on the received gestures. In one embodiment, the smart pen analyzes the gestures to determine whether they accurately follow the presented instructions and whether they accurately portray the symbol for which instruction is being provided. One or more exemplary gestures (also referred to as model gestures or target gestures) may be stored in the smart pen 100 for comparison to the gestures received from the user, and the degree of deviation from the exemplary gestures can be determined.

The determined feedback is presented 308 to the user through various means as described below (e.g., visual, audio, haptic). The feedback may provide the user with an indication of the correctness of the gesture and may offer suggestions for improvement. The smart pen 100 determines 310 the next instruction based on the received gestures and the determined feedback. The next instruction may be for the user to retry the current instruction or for the user to move on to the next step of drawing the symbol, for example. The smart pen 100 can also determine 312 the user's level of skill. In one embodiment, this determination is made after the user has completed a sequence of gestures comprising a complete symbol. The skill level can be based on how well the user's gestures matched the exemplary gestures, on the number of retries needed by the user, or on other factors. The skill level can be displayed to the user and can be used to decide whether the user should progress to the next symbol or continue practice with the current symbol.

Figure 4:
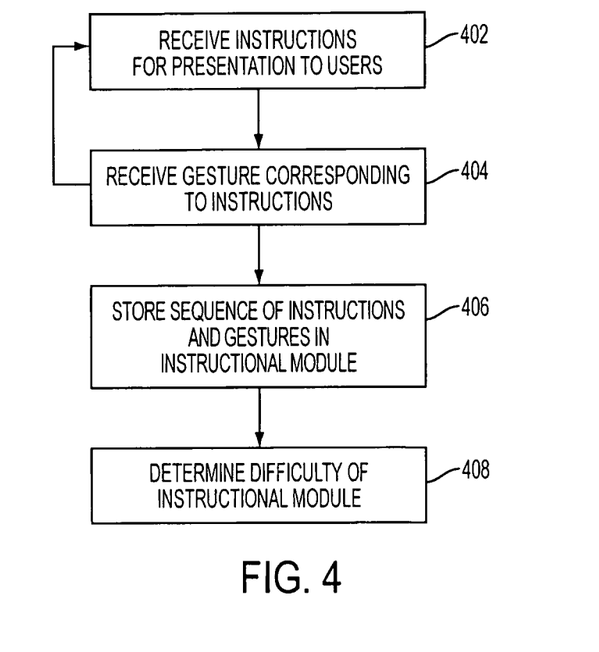
FIG. 4 illustrates an embodiment of a process for creating instructional modules using a pen-based computing system.

The process for providing instruction described above in association with FIG. 3 can be implemented by an application on the smart pen 100 or attached computing system 120 that reads an instructional module, where the instructional module is stored on the smart pen or attached computing system. This instructional module may include the various instructions and corresponding exemplary gestures. FIG. 4 illustrates an embodiment of a process for creating instructional modules using a pen-based computing system. This process may be carried out by an application for creating instructional modules on the smart pen or attached computing device. In one embodiment, the application receives 402 instructions intended for presentation to users. For example, an instructor may speak the instructions into a microphone of the smart pen. The smart pen receives 404 gestures corresponding to the instructions made by the instructor on dot-enabled paper. These gestures may be stored as exemplary gestures and can be later compared to gestures received from a learning user to determine 306 feedback. The application may receive a sequence of instructions and corresponding exemplary gestures and store 406 this sequence in an instructional module on the smart pen or attached computing system.

In one embodiment, the difficulty of an instructional module is determined 408 (e.g., on a scale from 1 to 10). This difficulty may be based on an analysis of the complexity of the gestures received in step 404. The difficulty of various instructional modules may be displayed to users to enable the users to select modules of appropriate difficulty. The difficulty measure may also be used to automatically determine an appropriate sequence for presenting instructional modules to a user. An instructional module may be chosen for presentation to a user based on a comparison of the difficulty of the instructional module as determined in step 408 and the determination of a user's level of skill in step 312.

Instructional System Examples

In one embodiment, the smart pen 100 allows the user to practice drawing symbols while teaching the user the syntax, semantics, and application of the symbols. The user may receive audio instructions from the smart pen speaker 225. Since the smart pen 100 is aware of what the user is actually drawing, the smart pen 100 can also offer feedback to the user and present the next step to the user when the user is ready (e.g., as described in association with FIG. 3). The user may also receive visual feedback from the display 235 of the smart pen 100. The display can show, for example, an animated exemplar symbol that the user is learning to draw, where the animation illustrates the sequence of motions required to draw the symbol. As a result, the user's area of focus can be limited to less than six inches wide. The user can receive interpretive feedback synchronized with the user's progress in drawing the symbol, providing an impactful, efficient, and emotionally satisfying learning experience.

In one embodiment, the user traces over a symbol and records it for subsequent practice, for example using dot-enabled tracing paper. The gestures made during tracing may be recorded in an instructional module (e.g., as described in FIG. 4). The user can then learn to draw the symbol without tracing using the instructional module. The user (or an instructor) can record instructional audio either during tracing or subsequent to the tracing, and this audio can be played back when the user later attempts to draw the symbol, as described above.

The exemplar symbol may be scaled to fit on the display 235 of the smart pen 100. The smart pen 100 may provide user controls for panning and zooming the symbol in the display. For example, the user presses a button on the smart pen or taps or drags the pen in certain recognized sequences to pan or zoom the symbol. The symbol may also be intelligently scaled, for example by zooming into the portion of the symbol that is currently being drawn by the user.

The attached computing system 120 may be used both for presenting instructions and presenting feedback to a user. Since the attached computing system can have a larger display than the display on the smart pen, it may be useful to display complex exemplar symbols on the attached computing system. The user can similarly interact with other devices such as another smart pen, a PC tablet, a Smartphone, or an eBook.

The feedback provided to the user may be provided substantially in real time, even in mid-gesture. For example, as the user attempts to draw a symbol on dot-enabled paper, the user's rendering of the symbol can be displayed in real time on the display of the smart pen or attached computing device. The user's rendering may be superimposed on an exemplar symbol to show, in real time, the accuracy of the user's symbol on the display. Other types of feedback can be provided nearly in real time, such as audio or haptic feedback. For example, a sound could be emitted from the smart pen speaker 225 immediately when the user deviates from the correct stroke, and the sound can indicate particular remedial action the user should take (e.g., a certain pitch indicates that the user should move the pen to the left). Haptic feedback may involve causing to pen to vibrate when the user deviates from the correct stroke. The user can then reconsider the stroke and make appropriate corrections.

Instructional Modules

As mentioned above, instructional modules may be created for a student by an instructor, a fellow student, or the student himself/herself. In addition to describing the symbol, the instruction module may contain information about the syntax or use of the symbol and present this information to the student/user. The instructional module may suggest or specify that a particular symbol be drawn next based on the current context and previously drawn symbols. The instructional module may be stored and distributed to multiple students.

An instructional sequence may be presented to a user, where the user learns to draw multiple symbols. In one embodiment, the system determines the user's skill at drawing a particular symbol and continues to have the user practice with that symbol until a level of skill is reached. Once a certain level of skill is reached (e.g., as determined in step 312), the system presents the next symbol to the user. The smart pen may automatically analyze newly entered symbols (e.g., step 408), and determine the appropriate placement of the symbol in a sequence of instructional modules.

A language learning system may be created that includes symbol recognition, writing, speaking, and listening. For example, a system for learning Mandarin may involve presenting Mandarin characters to the user on the smart pen display and having the user draw characters with feedback as described above. Characters and words may also be played to the user from the smart pen speaker, and characters and words may be recorded by the smart pen microphone. The recorded writing and audio may be stored for later review by an instructor and may also be analyzed immediately by the computing resources of the smart pen or an remote device. The system integrates various aspects of the language. For example, a character is displayed and the user is requested to speak the character into the microphone. Alternatively, the smart pen 100 plays an audio of a word (in Mandarin or in English) and requests the user to write the word (in Mandarin). A language learning system may include scientifically-based interval exposures and transitions between reading, writing, speaking, and listening.

The system may include the elements described above in various combinations to create interactive instructional modules that enable the user to learn combinations of symbols (including written languages) with various types of feedback.

Symbols Containing Additional Information

Historically, the information conveyed in a symbol has been limited to the visual representation of the symbol itself (i.e., the appearance of the symbol on a printed page or on a computer display). However, it is possible to record significantly more information about a symbol using a smart pen with coded paper. Possible information includes the pressure applied when creating various parts of the symbol, the stroke order used to create the symbol, the stroke speed, the pen angle, and the pen rotation. This additional information associated with a symbol may be used to differentiate visually identical symbols for instructional or variable transcription purposes.

In learning a symbol, a user may write a symbol that is visually correct but inefficiently drawn. By recording the additional information described above, the user can be taught to create the symbol in a more efficient, kinesthetic manner. For example, the stroke order, stroke speed, and pen angle of the user when writing the symbol may be compared to the exemplar stroke order, stroke speed, and pen angle provided in an instructional module, and the user instructed to make appropriate modifications. In addition to any of the feedback methods described above, increased stroke speed may drive a speech synthesis engine to apply variable inflection, prosody, and speed to audio played by the smart pen, such as instructional audio to the user. Increased pressure could drive a synthetic volume.

Also, stroke order or other additional information (such as stroke direction or pressure) enables variable transcription of the same symbol. The same symbol may take on different meanings depending on the stroke order or direction used to create the symbol. For example, a cross "+" could have at least four different meanings based on stroke order and direction, such as:

Stroke Order: Vertical stroke drawn first, from top to bottom; horizontal stroke second from left to right. Interpretation: a "plus sign"

Stroke Order: Vertical stroke drawn first, from top to bottom; horizontal stroke second from right to left. Interpretation: the word "the"

Stroke Order: Horizontal stroke drawn first from left to right; vertical stroke drawn second from top to bottom. Interpretation: a command to tell a PC to speak the previous sentence aloud.

Stroke Order: Horizontal stroke drawn first from right to left; vertical stroke drawn second from bottom to top. Interpretation: a command to tell a PC to send all written text to an email address that follows.

As a result, a single visual representation may correspond to multiple symbols with multiple meanings. This is also referred to as overloading a symbol. In the example given above, the cross "+" is overloaded with four meanings. Generally, a symbol will be overloaded with meanings that have a more logical relationship than in the example given above, but no relationship is required. The system may store the additional information with the visual representation of the system so that the symbol meaning can be determined during a later examination. The system may also expand the meaning of a symbol immediately and store the expanded symbol.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for instructing a student to create a plurality of target symbols, the method comprising:

capturing, by a smart pen device, a plurality of instructional modules, each instructional module comprising a sequence of target gestures made by an instructor on a dot-enabled surface, wherein a target symbol is created by the sequence of target gestures;

presenting to the student on a display of the smart pen device, a representation of the sequence of target gestures of a first instructional module;

capturing, by the smart pen device, a second sequence of gestures made by the student on the dot-enabled surface, wherein a second symbol is created by the second sequence of gestures;

comparing, by the smart pen device, the second symbol to the target symbol associated with the first instructional module and comparing the second sequence of gestures to the sequence of target gestures associated with the first instructional module;

determining, by the smart pen device, feedback based on the comparisons, wherein the feedback indicates a similarity between the target symbol associated with the first instructional module and the second symbol made by the student, and a similarity between the sequence of target gestures associated with the first instructional module and the second sequence of gestures;

presenting, by the smart pen device, the feedback to the student;

selecting, by the smart pen device, a second instructional module based on the comparisons; and presenting to the student on the display of the smart pen device, a representation of the sequence of target gestures of the second instructional module.

2. The method of claim 1, wherein the feedback is presented on a display of the smart pen device.

3. The method of claim 1, wherein the feedback is presented through a speaker of the smart pen device.

4. The method of claim 1, wherein the feedback is presented haptically through the smart pen device.

5. The method of claim 1, wherein the feedback is presented substantially in real time as the second sequence of gestures is captured.

6. The method of claim 1, wherein the sequence of target gestures associated with the first instructional module and the second sequence of gestures are digitally captured using an imaging system in the smart pen device.

7. The method of claim 1, wherein the dot-enabled surface comprises an encoded coordinate system that is readable by the smart pen device.

8. The method of claim 1, wherein selecting the second instructional module comprises:
determining a skill level of the student based on the comparisons;
determining a difficulty of each of the instructional modules; and
selecting the second instructional module based on the determined skill level of the user and the difficulty of the second instructional module.

9. A non-transitory computer-readable storage medium storing computer program instructions for instructing a student to create a plurality of target symbols, the instructions when executed by a processor cause the processor to perform steps comprising:
capturing a plurality of instructional modules, each instructional module comprising a sequence of target gestures made by an instructor on a dot-enabled surface, wherein a target symbol is created by the sequence of target gestures;
presenting to the student on a display of the smart pen device, a representation of the sequence of target gestures of a first instructional module;
capturing a second sequence of gestures made on by the student on the dot-enabled surface, wherein a second symbol is created by the second sequence of gestures;
comparing the second symbol to the target symbol associated with the first instructional module and comparing the second sequence of gestures to the sequence of target gestures associated with the first instructional module;
determining feedback based on the comparisons, wherein the feedback indicates a similarity between the target symbol associated with the first instructional module and the second symbol made by the student, and a similarity between the sequence of target gestures associated with the first instructional module and the second sequence of gestures;
presenting the feedback to the student;
selecting a second instructional module based on the comparisons; and
presenting to the student on the display of the smart pen device, a representation of the sequence of target gestures of the second instructional module.

10. The non-transitory computer-readable storage medium of claim 9, wherein presenting with the smart pen device, the representation of the sequence of target gestures associated with the first instructional module includes presenting to the student, textual instructions for making the sequence of target gestures associated with the first instructional module.

11. The non-transitory computer-readable storage medium of claim 9, wherein the feedback is presented on a display of the smart pen device.

12. The non-transitory computer-readable storage medium of claim 9, wherein the feedback is presented substantially in real time as the second sequence of gestures is captured.

13. The non-transitory computer-readable storage medium of claim 9, wherein the sequence of target gestures associated with the first instructional module and the second sequence of gestures are digitally captured using an imaging system in the smart pen device.

14. The non-transitory computer-readable storage medium of claim 9, wherein the dot-enabled surface comprises an encoded coordinate system that is readable by the smart pen device.

15. The non-transitory computer-readable storage medium of claim 9, wherein the instructions causing the processor to select the second instructional module comprise instructions that when executed by the processor cause the processor to:
determine a skill level of the student based on the comparisons;
determine a difficulty of each of the instructional modules; and
select the second instructional module based on the determined skill level of the user and the difficulty of the second instructional module.

16. A smart pen device for instructing a student to create a target symbol, the smart pen device comprising:
a processor; and
a non-transitory computer-readable storage medium storing computer-executable program instructions, the instructions when executed by the processor to perform steps including:
capturing a plurality of instructional modules, each instructional module comprising a sequence of target gestures made by an instructor on a dot-enabled surface, wherein a target symbol is created by the sequence of target gestures;
presenting to the student on a display of the smart pen device, a representation of the sequence of target gestures of a first instructional module;

capturing a second sequence of gestures made by the student on the dot-enabled surface, wherein a second symbol is creating by the second sequence of gestures;

comparing the second symbol to the target symbol associated with the first instructional module and comparing the second sequence of gestures to the sequence of target gestures associated with the first instructional module;

determining feedback based on the comparisons, wherein the feedback indicates a similarity between the target symbol associated with the first instructional module and the second symbol made by the student, and a similarity between the sequence of target gestures associated with the first instructional module and the second sequence of gestures;

presenting the feedback to the student;

selecting a second instructional module based on the comparisons; and presenting to the student on the display of the smart pen device, a representation of the sequence of target gestures of the second instructional module.

17. The smart pen device of claim 16, wherein the feedback is presented on a display of the smart pen device.

18. The smart pen device of claim 16, wherein the feedback is presented through a speaker of the smart pen device.

19. The smart pen device of claim 16, wherein the feedback is presented haptically through the smart pen device.

20. The smart pen device of claim 16, wherein the instructions causing the processor to select the second instructional module comprise instructions that when executed by the processor cause the processor to:

determine a skill level of the student based on the comparisons;

determine a difficulty of each of the instructional modules; and select the second instructional module based on the determined skill level of the user and the difficulty of the second instructional module.

* * * * *